Figure 3:
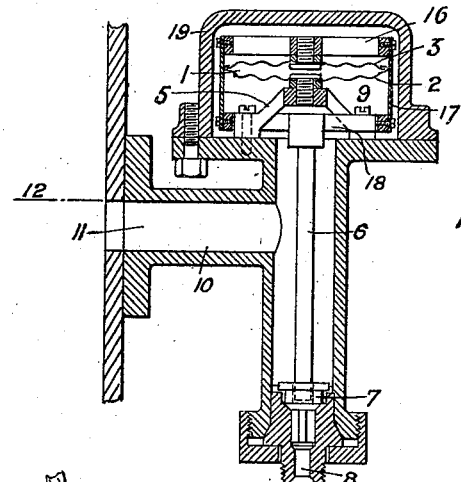

No. 718,329. PATENTED JAN. 13, 1903.
E. M. EDEN.
APPARATUS FOR CONTROLLING THE PASSAGE OF STEAM OR WATER.
APPLICATION FILED OCT. 11, 1901.
NO MODEL.
3 SHEETS—SHEET 1.
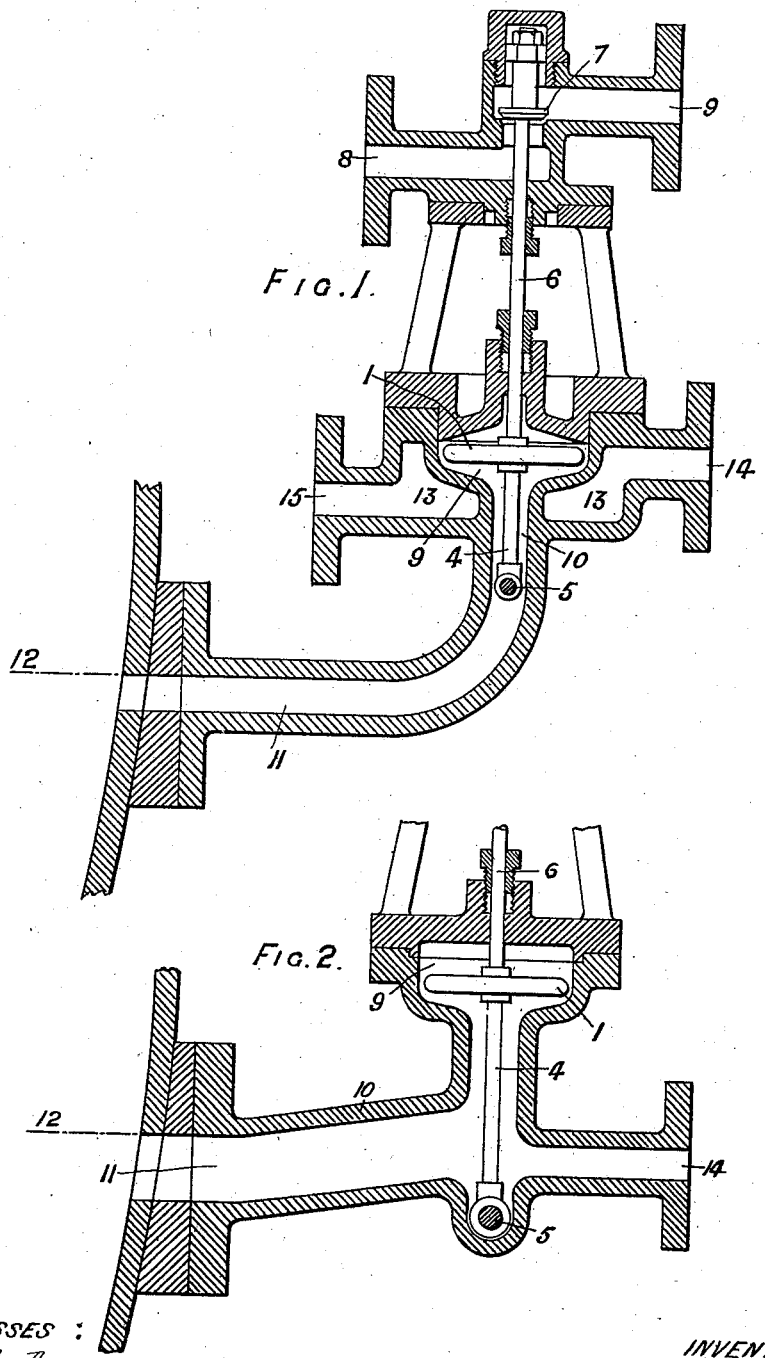
WITNESSES:
W. M. Avery
Walton Harrison
INVENTOR
Edgar M. Eden
BY
ATTORNEYS.

No. 718,329. PATENTED JAN. 13, 1903.
E. M. EDEN.
APPARATUS FOR CONTROLLING THE PASSAGE OF STEAM OR WATER.
APPLICATION FILED OCT. 11, 1901.
NO MODEL. 3 SHEETS—SHEET 3.

WITNESSES:
W. M. Avery
Walton Harrison

INVENTOR
Edgar M. Eden
BY
ATTORNEYS.

UNITED STATES PATENT OFFICE.

EDGAR MARK EDEN, OF LONDON, ENGLAND.

APPARATUS FOR CONTROLLING THE PASSAGE OF STEAM OR WATER.

SPECIFICATION forming part of Letters Patent No. 718,329, dated January 13, 1903.

Application filed October 11, 1901. Serial No. 78,311. (No model.)

*To all whom it may concern:*

Be it known that I, EDGAR MARK EDEN, mechanical engineer, a subject of the King of Great Britain, residing at 76 Adelaide road, London, England, have invented new and useful Improvements in Apparatus for Controlling the Passage of Steam or Water, of which the following is a specification.

This invention has for its object to provide, in connection with a steam-boiler, steam-trap, or other steam-container, valve-operating means whereby to cause a valve controlling the passage or escape of steam or water to be automatically operated for the purpose of regulating directly or indirectly the action of a feed-pump or injector or for permitting the escape of water from a steam-trap or for permitting the passage of steam to a whistle in the case of a high or a low water alarm, the action of the valve-operating device being dependent on difference or equality of pressures established within the device, according as the temperature of the contents of the device differs or not from the temperature of steam at the pressure within the boiler or other steam-container with which it may be connected, whatever that pressure may be. The principal advantages of the invention are power and certainty of action and adaptability to work through a wide range of pressures without the necessity of adjustment to suit any particular or limited range of pressure.

My invention consists, essentially, in a valve-operating device wherein the operation of the valve is dependent on and in accordance with difference or equality of pressures established within and without a combined pressure-generating and motion-transmitting chamber containing a liquid and its vapor, the pressure-generating chamber being surrounded by an inclosed space in constant communication with the steam-boiler, steam-pipe, or other steam-container to which the invention is applied by a passage connected therewith at a point situated at what may be termed the "critical water-level" of the container—that is to say, the water-level within the container at which the device is required to act.

The arrangement must in all cases be such that heat will, as far as possible, be transmitted to or from the contents of the pressure-generating chamber only through the fluid medium contained in said space, so that the contents of the pressure-generating chamber shall always be, as nearly as possible, at the same temperature as the fluid medium contained in the surrounding space. Provision is made for insuring the constant abstraction of heat from this medium, and the establishment of the difference or equality of pressures upon which the action of the motion-transmitting chamber (which is mechanically connected to the valve to be operated) depends is dependent on whether or not the temperature of the surrounding medium, and consequently the pressure of the contents of the inclosed pressure-generating chamber, can be lowered by abstraction of heat from the said medium under the conditions above mentioned. In other words, the nature of the medium—*i. e.*, whether steam or water—present for the time being in the space surrounding the pressure-generating chamber is tested or ascertained, and the valve is moved according as the pressure of the contents of the pressure-generating chamber can or cannot be reduced below the pressure of the surrounding medium by the abstraction of heat from that medium, the direction in which the valve is moved with regard to its seat depending on the function which it is intended to fulfil.

If the contents of the pressure-generating chamber be steam and water and if the surrounding medium for the time being be saturated steam in open connection with the steam-space of the boiler or other steam-container, the said chamber will be in equilibrium so far as the internal and external pressures acting thereon are concerned, whatever those pressures may be, and although the abstraction of heat from the medium surrounding the chamber will cause condensation of the said medium the temperature of the medium will not be lowered, since the steam condensed will be constantly replaced; but if the said surrounding medium for the time being be water its temperature may be lowered considerably below that of steam at the then actual pressure of the said medium—*i. e.*, boiler or other steam pressure—while its pressure remains unaltered, so that the contents of the pressure-generating chamber will then have a pressure corresponding only to the lowered temperature of the said medium. The difference of pressures will therefore be established only if the pressure within the pressure-generating chamber can be lowered below the pressure of the surrounding medium by the abstraction of heat from that medium, which is only possible under the given conditions when that medium is water.

The contents of the pressure-generating and motion-transmitting chamber are preferably water and steam, or may be any other suitable liquid and its vapor, or a mixture of liquids and the vapor thereof.

If the contents of the chamber be alcohol and alcohol-vapor, for instance, the action will be similar to that of water and steam, except that equilibrium will occur when the temperature of the medium corresponds to that of alcohol-vapor at the then actual pressure of that medium.

The invention herein described may be embodied in various forms of apparatus, according to the purposes for which they are to be used.

Reference is to be had to the accompanying drawings, forming part of this specification, wherein—

Figure 4:
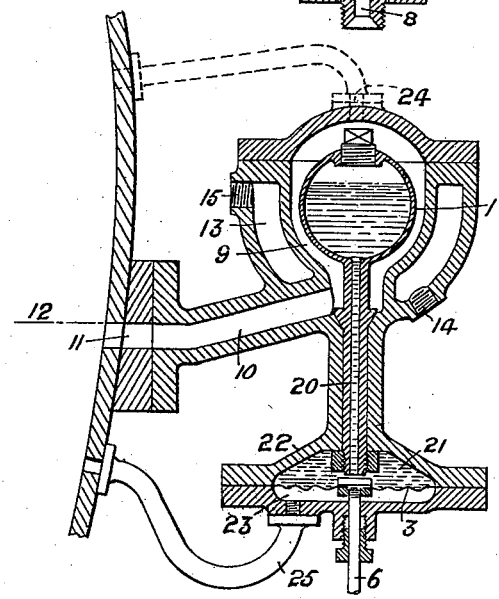
Figure 7:
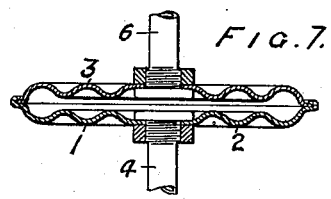
Figure 6:
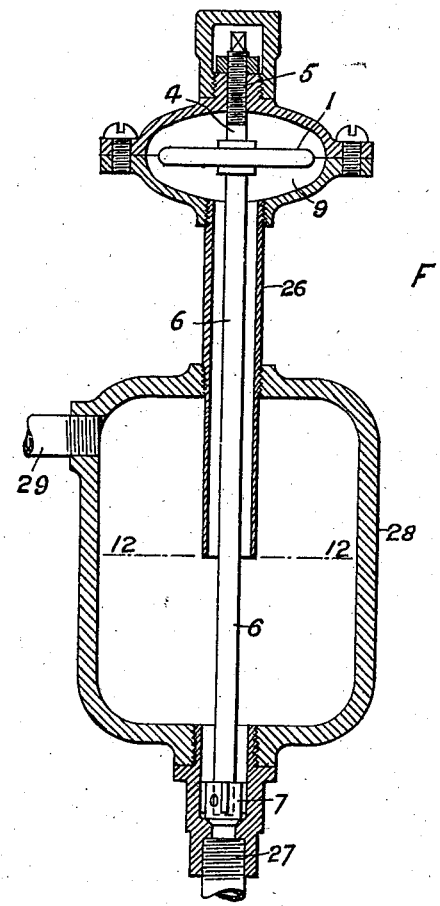
Figure 5:
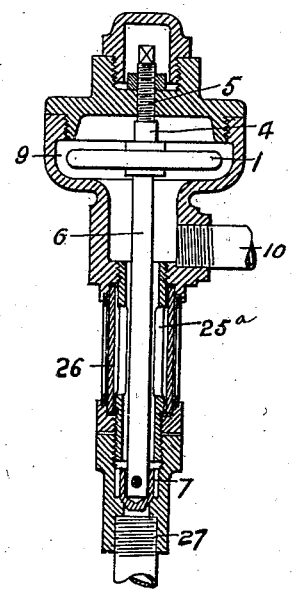

Figure 1 represents a vertical axial section of a feed-water regulator embodying my invention, and Figs. 2, 3, and 4 represent similar views of different modifications thereof. Fig. 5 represents a vertical axial section of a steam-trap embodying my invention, and Fig. 6 represents a modification thereof. Figs. 1, 2, and 4, modified as hereinafter described, also illustrate the application of the invention for high or for low water alarms. Fig. 7 is an axial section of the motion-transmitting or flexible chamber.

The same reference-numerals indicate the same parts in all the figures.

Referring to Figs. 1 and 7, 1 is the combined pressure-generating and valve-operating chamber containing but not filled with water and constructed (like the flexible chamber of an aneroid barometer) of two flexible diaphragms 2 3, united, as shown in section in Fig. 7, and hermetically closed. The chamber may, however, be otherwise contructed so as to enable change of its shape under variations of difference of external and internal pressures to produce the required motion. For instance, it may be constructed and act in the manner of a Bourdon tube. The one flexible diaphragm 2 is anchored by a rod 4 to a fixed point 5, while the other diaphragm is connected to the rod 6 of a valve 7, which may either control the admission of feed-water to the boiler or the passage of steam from the boiler to the feed-pump or injector, the connection 8 being in the first case to the feed-pump delivery and in the second case to the steam-space of the boiler, while the connection 9 is in the first case directly or indirectly to the water-space of the boiler and in the second case to the injector or the valve-chest of the feed-pump. In constructing this pressure-generating and valve-operating chamber it is preferred to partially fill it with the liquid, which is then boiled to expel all air from the chamber through a blow-hole left for the purpose, which blow-hole is then sealed off—as, for example, by soldering into the blow-hole a tinned plug—while the contents of the chamber are still boiling, so that the chamber will always contain the said liquid and its vapor.

The pressure-generating and valve-operating chamber 1 is inclosed in a space 9, which is constantly open to the boiler through a passage 10, having a general downward inclination toward the boiler, so as to permit any water condensed in space 9 to flow back into the boiler, the mouth 11 of this passage being so situated that the passage will remain open to the boiler steam-space so long as the water within the boiler is below the critical level on the attainment of which by the water the apparatus is required to act, but will become sealed by the water when the latter attains said level. In Fig. 1 the apparatus is supposed to be bolted to the boiler in such position that the upper edge of the orifice 11 is at about the desired water-level of the boiler, as indicated by the line 12. The casing inclosing the space 9 is surrounded by a water-jacket 13, through which the feed-water on its way to the boiler passes by the inlet and outlet passage 14 15, thereby constantly abstracting heat from the medium with which space 9 is filled. So long as the water-level in the boiler is below the level of the line 12 the space 9 will be filled with steam, and the water and its vapor in chamber 1 will have a pressure equal to that of the steam in space 9, and the pressures within and without the chamber 1 are therefore in equilibrium. The abstraction of heat from the steam in space 9 by the feed-water passing through the jacket 13 produces no effect, since the water of condensation drains back to the boiler and the steam condensed is replaced by more steam from the boiler, so that no cooling of the contents of chamber 1 can take place. When, however, by the water-level in the boiler rising above the line 12 the supply of steam to space 9 is cut off, said space becomes flooded with water from the boiler, the abstraction of heat therefrom by the feed-water passing through the jacket 13 lowers the temperature of the water in space, while its pressure still remains that of the boiler. By the cooling of the water in space 9 the temperature, and consequently the pressure, of the contents of chamber 1 will be lowered, and the equilibrium of pressures being thus destroyed the said chamber will be collapsed under the superior pressure in the space 9.

In the arrangement under consideration the valve 7 is supposed to control the supply of feed-water to the boiler or of steam to the feed-pump or injector. Consequently so long as the chamber 1 is in equilibrium as regards its internal and external pressures the valve 7 is arranged to remain open, and when the chamber 1 is collapsed under the superior external pressure the valve 7 will be closed, thus cutting off the supply of feed-water to the boiler, either directly or by cutting off the supply of steam to the feed-pump or injector. If the valve 7 controls the supply of feed-water directly, the orifices 9 and 14 may for purposes of explanation be supposed to be directly connected together by a pipe and the feed-water may enter the boiler at any desired point.

The modification shown in Fig. 2 only differs from the form already described in that the water-jacket 13 around space 9 is dispensed with and that the feed-water inlet 14 leads directly into the passage 10 and flows along said passage to the boiler, thus cooling the contents of the space 9 by convection. In this case the passage 10 must be of sufficient diameter to allow of the free passage (above the incoming feed-water) of steam from the boiler to the space 9, so long as the water-level in the boiler remains low.

In either arrangement the valve 7 instead of controlling the admission of feed-water to the boiler or the supply of steam to the pump or injector may be a relief-valve permitting the escape of water from the feed-pump, the only difference being that in that case its motion with regard to its seat will be inverted, so that it will be opened when the chamber 1 is collapsed, the effect in all cases being to control the supply of water to the boiler.

In order to adapt either of these arrangements for the purpose of a low-water alarm, the feed-pipe is not required and the abstraction of heat is effected by radiation to the atmosphere. In this case the apparatus is fixed in such position that the line 12 indicates the low-water level, so that the space 9 will be normally filled with water and the flexible chamber 1 will normally remain collapsed, so that the valve 7 (which is the valve controlling the escape of steam from the boiler or the passage of steam from the boiler to the steam-whistle) will normally remain closed until the surrounding medium becomes steam, whereupon equilibrium is established by the rise of pressure within said chamber and the valve is opened. The apparatus as thus altered, and as further altered so that the action of the valve will be inverted, will also serve for a high-water alarm, the apparatus being in that case fixed so that the critical level (indicated by the line 12) is the high-water-alarm level. The space 9 in this case is normally filled with steam, and when that space becomes filled with water from which heat is abstracted the effect is to cause the collapse of the chamber 1 under the superior pressure within space 9, and thereby to open the valve 7 instead of closing it, as in the other case.

Fig. 3 shows a simple form of feed-water regulator. In this case the lower diaphragm 2 is anchored to a fixed spider-frame 5, while the upper diaphragm 3 of the flexible chamber is connected to a spider-frame 16, connected by a short length of tube 17 or other convenient means of connection to another spider-frame 18, attached to the rod 6, by which the valve 7 is closed to its seat over the feed-water inlet 8. 10 is the passage connected to the boiler at or just below the water-level 12. 9 is the space surrounding the flexible chamber 1 in communication with the boiler by passage 10 and inclosed in a casing 19, which is cooled by radiation, so that when the contents of space 9 are water they will be cooled by that means as well as by convection with the incoming feed-water.

In Fig. 4 the pressure-generating element 1 of the combined pressure-generating and valve-operating chamber is not itself expansible and contractible, but is in open communication by a tube 20 with a space 21, inclosed by the valve-operating element formed by the diaphragm 3. The space 21 is thus virtually a portion of the chamber 1 for the purposes of transmission of fluid-pressure to the diaphragm 3; but the tube 20 is of such small diameter that the transmission of heat by convection or circulation of the fluid will be very restricted. The diaphragm 3, which is clamped to a casing 22, separates the space 21 from an inclosed space 23, which is in free communication with the water-space (or it might be the steam-space) of the boiler by means of a connection 25, so that the boiler-pressure constantly acting on the lower side of the diaphragm will be opposed by the pressure generated in space 1, acting on the upper side of said diaphragm. 6 is the valve-rod connected to the diaphragm 3. 9 is the space surrounding the pressure-generating chamber 1 and connected with the boiler by passage 10, 12 being the critical water-level. 13 is a water-jacket around the space 9, and 14 15 the inlet and outlet through which the feed-water flows on its way to the boiler. A pipe may be attached at 24 to permanently connect the upper part of space 9 with the boiler steam-space, so that the water-level in 9 shall always correspond to that in the boiler, instead of the space 9 becoming suddenly flooded up on the complete condensation of the steam in said space, when access of steam thereto is cut off by the rise of water-level in the boiler, as would otherwise be the case. In this arrangement the diaphragm 3 is not exposed to sudden variations of temperature, such as those to which it may be subjected in the other arrangement.

Fig. 5 shows the invention as embodied in the form of a steam-trap. 1 is the flexible pressure-generating and valve-operating chamber, its upper side being anchored to a fixed point 5 and its lower side connected to the rod 6 of valve 7. The chamber 1 is surrounded by space 9 within a casing connected with the part in which the valve 7 is seated by a slotted tube 25ª, inclosed in a gage-glass tube 26, through which the operation of the trap will be visible. 10 is the passage connecting the space 9 with the steam-pipe or other space to be drained of water, and 27 is the outlet for the water drained off under the control of valve 7. The action of the apparatus is the same as before described in respect of a feed-water regulator, except that the valve 7 is opened when the chamber 1 collapses under the superior pressure in space 9 consequent on the pressure within said chamber 1 becoming reduced in consequence of the temperature of the medium contained in space 9 being reduced below that of saturated steam at the same pressure as the said medium, heat being constantly abstracted from the said medium by radiation from the casing.

In Fig. 6 the space 9 communicates by tube 26ª with a chamber 28, which is connected at 29 with the steam-pipe or other steam container or which may itself be the space to be drained. 1 is the flexible pressure-generating and valve-operating chamber, connected at top to a fixed point and at bottom to the rod 6 of valve 7, seated over the water-outlet 27, the action being similar to that of the arrangement shown in Fig. 5 and the opening of the valve occurring when so much water has accumulated in chamber 28 that the water-level therein rises above the lower end of tube 26ª (which end is at the critical water-level 12) and cuts off the access of steam to the space 9. In this case, however, it is not necessary that the whole contents of the trap be cooled below the temperature of steam at the pressure within the trap, as the valve 7 will be opened and permit the evacuation of the trap as soon as the temperature of the contents of space 9 is sufficiently reduced by radiation.

It is to be understood that by the term "steam-container" as employed in the claims a steam-boiler or a steam-pipe or other capacity for steam under pressure is meant.

I claim—

1. A valve-operating device for controlling the passage of steam or water according as the water in a steam-container is above or below a certain critical level, said device consisting of a pressure-generating chamber containing a liquid and its vapor and surrounded by an inclosed space so that the contents of the pressure-generating chamber shall have the same temperature as the contents of the said space, the said space being in open communication with the steam-container at about the said critical water-level so that the said space will contain either water or steam according as the water-level in the steam-container is or is not above the critical water-level, a valve-operating element connected to the valve and acted on in one direction by the pressure within the pressure-generating chamber and in the other direction by the pressure of the steam in the steam-container, so that the said valve-operating element will be moved in accordance with the variation of the difference of such pressures, and means whereby heat is constantly abstracted from the contents of the space surrounding the pressure-generating chamber.

2. A valve-operating device for controlling the passage of steam or water according as the water in a steam-container is above or below a certain critical level, said device comprising a pressure-generating and valve-operating chamber containing a liquid and its vapor and capable of variation of shape under the relative variation of opposing pressures acting internally and externally thereon, connections between said chamber and an abutment on the one hand and the valve on the other, such that change of shape of said chamber will cause motion to be transmitted to the valve, a casing inclosing a space surrounding the pressure-generating chamber and adapted to be subjected to an external cooling influence, a passage downwardly directed from said space and adapted to put the said space in open communication with the steam-container, the space in which the valve-operating part of the chamber is inclosed being also adapted to be in open communication with the steam-container.

3. In combination with a steam-container a valve-operating device for controlling the passage of steam or water according as the water in the steam-container is above or below a certain critical level, said device comprising a pressure-generating and valve-operating chamber capable of variation of shape under the relative variation of opposing pressures acting internally and externally thereon, a liquid and its vapor contained within said chamber, mechanical connections between said chamber and an abutment on the one hand and the valve on the other such that change of shape of said chamber will cause motion to be transmitted to the valve, a casing inclosing a space around the pressure-generating chamber, a passage whereby said space is put in open communication with the steam-container at about the critical water-level thereof so that the said space will contain water or steam at the pressure of the steam-container according as the water-level in the steam-container is or is not above the critical level, the valve-operating part of the chamber being inclosed in a space also in open communication with the steam-container so that the said valve-operating part is always exposed externally to a fluid at the pressure of the steam-container, and means whereby heat is constantly abstracted from the fluid surrounding the pressure-generating chamber so as to cause the internal pressure of said chamber to be lowered and difference of the opposing pressures acting on the valve-operating part of the chamber to be established, when the fluid in the space around the pressure-generating chamber is water.

4. A valve-operating device for controlling the supply of feed-water according to the level of the water in a steam-boiler, said device comprising a closed chamber capable of variation of shape under the relative variation of opposing pressures acting internally and externally thereon and in mechanical connection on the one hand with a fixed abutment and on the other with the valve to be operated, said chamber containing a liquid and its vapor and being placed within an inclosed space communicating with the boiler at about the critical water-level thereof, so that according as the water in the boiler is or is not below the critical level the said space will contain steam or water at the boiler-pressure, and means whereby the feed-water on its way to the boiler is caused to abstract heat from the medium in said space, as described.

5. A valve-operating device for controlling the passage of steam or water according to the level of the water in a steam-boiler, said device comprising a pressure-generating element containing a liquid and its vapor and formed by a rigid chamber connected by a tube of small diameter with a space closed by a flexible valve-operating diaphragm whereof the outer face is constantly exposed to boiler-pressure, said pressure-generating element being surrounded by an inclosed space communicating with the boiler at about the critical water-level thereof, so that (according as the water in the boiler is or is not below the critical level) the said space will contain steam or water at the boiler-pressure, and means whereby the constant abstraction of heat from the fluid contained in said space is effected as described.

EDGAR MARK EDEN.

Witnesses:
WALTER J. SKERTEN,
THOMAS W. KENNARD.